United States Patent
Wu et al.

(10) Patent No.: US 11,641,142 B2
(45) Date of Patent: May 2, 2023

(54) STATOR AND WINDING ASSEMBLY THEREOF

(71) Applicant: Delta Electronics, Inc., Taoyuan (TW)

(72) Inventors: Cheng-An Wu, Taoyuan (TW); Wei-Lun Kao, Taoyuan (TW); Min-Fu Hsieh, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 28 days.

(21) Appl. No.: 17/484,761

(22) Filed: Sep. 24, 2021

(65) Prior Publication Data

US 2022/0123619 A1   Apr. 21, 2022

Related U.S. Application Data

(60) Provisional application No. 63/092,805, filed on Oct. 16, 2020.

(30) Foreign Application Priority Data

May 18, 2021 (CN) .......................... 202110540314.0

(51) Int. Cl.
*H02K 3/47* (2006.01)
*H02K 3/04* (2006.01)
*H02K 3/46* (2006.01)

(52) U.S. Cl.
CPC .............. *H02K 3/47* (2013.01); *H02K 3/04* (2013.01); *H02K 3/46* (2013.01)

(58) Field of Classification Search
CPC .. H02K 3/00; H02K 3/04; H02K 3/46; H02K 3/47

USPC .................................................. 310/208, 214
See application file for complete search history.

(56) References Cited

U.S. PATENT DOCUMENTS

| | | | |
|---|---|---|---|
| 4,197,475 A | 4/1980 | Ban et al. | |
| 6,894,418 B2 | 5/2005 | Jones et al. | |
| 8,919,685 B2 | 12/2014 | Tassinario et al. | |
| 9,337,695 B2 * | 5/2016 | Clark | H02K 15/063 |
| 11,502,568 B2 * | 11/2022 | Frank | H02K 9/197 |

(Continued)

FOREIGN PATENT DOCUMENTS

| | | |
|---|---|---|
| CN | 101771319 A | 7/2010 |
| CN | 210041449 U | 2/2020 |

(Continued)

*Primary Examiner* — Rashad H Johnson
(74) *Attorney, Agent, or Firm* — Kirton McConkie; Evan R. Witt

(57) ABSTRACT

The present disclosure provides a stator and winding assembly thereof. The stator includes a stator core including a tube wall and a hollow portion and a winding assembly. The winding assembly is disposed in the hollow portion and includes a first winding group and a second winding group. The first winding group includes plural winding units disposed on an inner side of the tube wall and defining an outer layer. The second winding group includes plural winding units disposed on an inner side of the outer layer and defining an inner layer. Any one of the projections of the winding units at the inner layer is partially overlapped with the projections of the two adjacent winding units at the outer layer. A number of turns of the winding units of the first winding group is equal to or greater than that of the winding units of the second winding group.

16 Claims, 7 Drawing Sheets

(56) References Cited

U.S. PATENT DOCUMENTS

2012/0175991 A1    7/2012  Tassinario et al.
2017/0214286 A1    7/2017  Jin et al.
2021/0384794 A1*  12/2021  Tamura ................. H02K 3/522

FOREIGN PATENT DOCUMENTS

| | | |
|---|---|---|
| JP | H09056131 A | 2/1997 |
| JP | 2005176582 A | 6/2005 |
| JP | 2013165594 A | 8/2013 |
| TW | M309022 U | 4/2007 |

* cited by examiner

STATOR AND WINDING ASSEMBLY THEREOF

CROSS-REFERENCE TO RELATED APPLICATION

This application claims the benefit of U.S. Provisional Application Ser. No. 63/092,805 filed on Oct. 16, 2020 and entitled "STATOR AND WINDING ASSEMBLY THEREOF". This application also claims priority to China Patent Application No. 202110540314.0, filed on May 18, 2021. The entire contents of the above-mentioned patent applications are incorporated herein by reference for all purposes.

FIELD OF THE INVENTION

The present disclosure relates to a stator and a winding assembly thereof, and more particularly to a stator and a winding assembly thereof applicable to a slotless rotary electric machine.

BACKGROUND OF THE INVENTION

A rotary electric machine such as electric motor has been widely used in various fields and applications. Generally, a rotary electric machine includes a stator and a rotor. A magnetic flux is formed by the stator and acts on the rotor, so that an electromagnetic force is generated to push the rotor to rotate. In the past, most of the rotary electric machines were constructed according to slotted design in which the winding is wound between teeth in slots of the stator. Recently, progress has been made in the design of slotless rotary electric machine. Slotless rotary electric machine has great advantages over conventional slotted design. Since there is no cogging due to the absence of teeth in the slotless design, the operation of the slotless rotary electric machine is smooth over a wide speed range. As a result, the conventional rotary electric machines with slot design are gradually replaced by the slotless rotary electric machines.

At present, the winding assembly of a stator of a slotless rotary electric machine is constructed in single layer, two layers or multiple layers. As shown in FIGS. 1A and 1B, the stator 1 includes a stator core 11 and a winding assembly 12. The winding assembly 12 includes a plurality of winding units 13 with the same structure. The winding units 13 are arranged to encircle as a tube and are disposed on the inner surface of the stator core 11. Each of the winding units 13 includes a first lateral segment 13a and a second lateral segment 13b. The first lateral segment 13a and the second lateral segment 13b are disposed on the opposite side of the winding unit 13 and the profiles thereof are symmetric with each other. Each of the first lateral segments 13a of the winding units 13 is disposed on a relative-inner side of the second lateral segment 13b of another winding unit 13, thereby forming a tubular structure with two layers. That is, all of the first lateral segments 13a are substantially located at the inner layer, and all of the second lateral segments 13b are substantially located at the outer layer. In the inner space of the stator core 11, the position near to the inner surface of the stator core 11 is capable of accommodating more coils. However, in this structural design, since each of the winding units 13 simultaneously occupies the inner layer and the outer layer, the coil space factor of the outer layer is generally less than the coil space factor of the inner layer. Consequently, the space at the outer layer is not fully utilized. In addition, gaps and deviations frequently occur in this arrangement of the winding units 13. As a result, it is hard to improve the accuracy or precision of the winding assembly 12.

Therefore, there is a need of providing a stator and winding assembly thereof so as to obviate the drawbacks encountered from the prior arts.

SUMMARY OF THE INVENTION

It is an object of the present disclosure to provide a stator and a winding assembly thereof for addressing the drawbacks of the prior art.

It is another object of the present disclosure to provide a stator and a winding assembly thereof. The winding units are stacked in two layers along a radial direction of the stator core, and the number of turns of the winding unit disposed at the outer layer can be greater than the number of turns of the winding unit disposed at the inner layer. Thereby, the coil space factor of the outer layer is substantially equal to the coil space factor of the inner layer. Consequently, the inner space of the stator core is efficiently utilized, the torque of the rotary electric machine is enhanced, and the manufacturing process of the winding assembly is simplified.

In accordance with an aspect of the present disclosure, there is provided a stator. The stator is applicable to a rotary electric machine and includes a stator core and a winding assembly. The stator core includes a tube wall and a hollow portion. The winding assembly is disposed in the hollow portion and includes a first winding group and a second winding group. The first winding group includes a plurality of winding units. The plurality of winding units of the first winding group are disposed side by side on an inner side of the tube wall and collaboratively define an outer layer. The second winding group includes a plurality of winding units. The plurality of winding units of the second winding group are disposed side by side on an inner side of the outer layer and collaboratively define an inner layer. Each of the winding units at the inner layer is adjacent to two of the winding units at the outer layer. Any one of the shadows of the winding units at the inner layer projected on the tube wall is partially overlapped with the shadows of the two adjacent winding units at the outer layer projected on the tube wall. A number of turns of the winding units of the first winding group is equal to or greater than a number of turns of the winding units of the second winding group.

In accordance with another aspect of the present disclosure, there is provided a winding assembly configured to be disposed in a stator. The stator includes a tube wall. The winding assembly includes a first winding group and a second winding group. The first winding group includes a plurality of winding units. The plurality of winding units of the first winding group are disposed side by side on an inner side of the tube wall and collaboratively define an outer layer. The second winding group includes a plurality of winding units. The plurality of winding units of the second winding group are disposed side by side on an inner side of the outer layer and collaboratively define an inner layer. Each of the winding units at the inner layer is adjacent to two of the winding units at the outer layer. Any one of the shadows of the winding units at the inner layer projected on the tube wall is partially overlapped with the shadows of the two adjacent winding units at the outer layer projected on the tube wall. A number of turns of the winding units of the first winding group is equal to or greater than a number of turns of the winding units of the second winding group.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
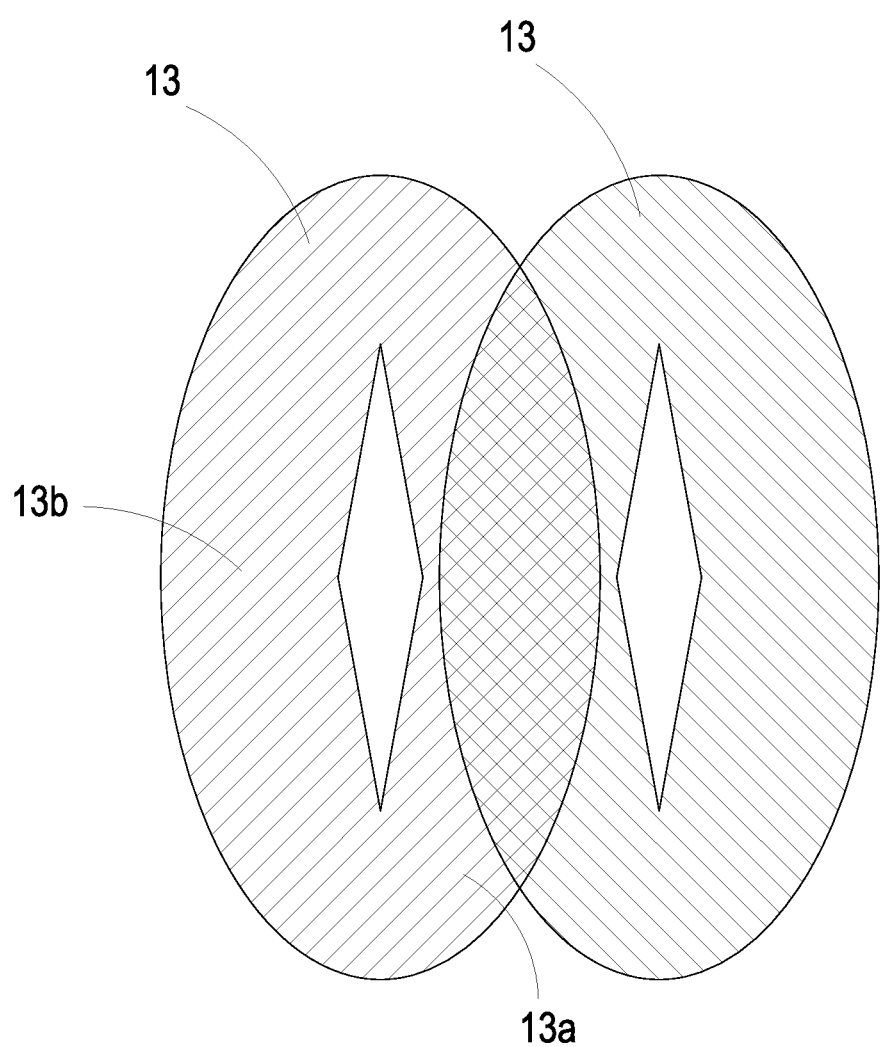
FIG. 1A is a schematic perspective view partially showing a conventional winding assembly of a stator of a slotless rotary electric machine.
Figure 1B:
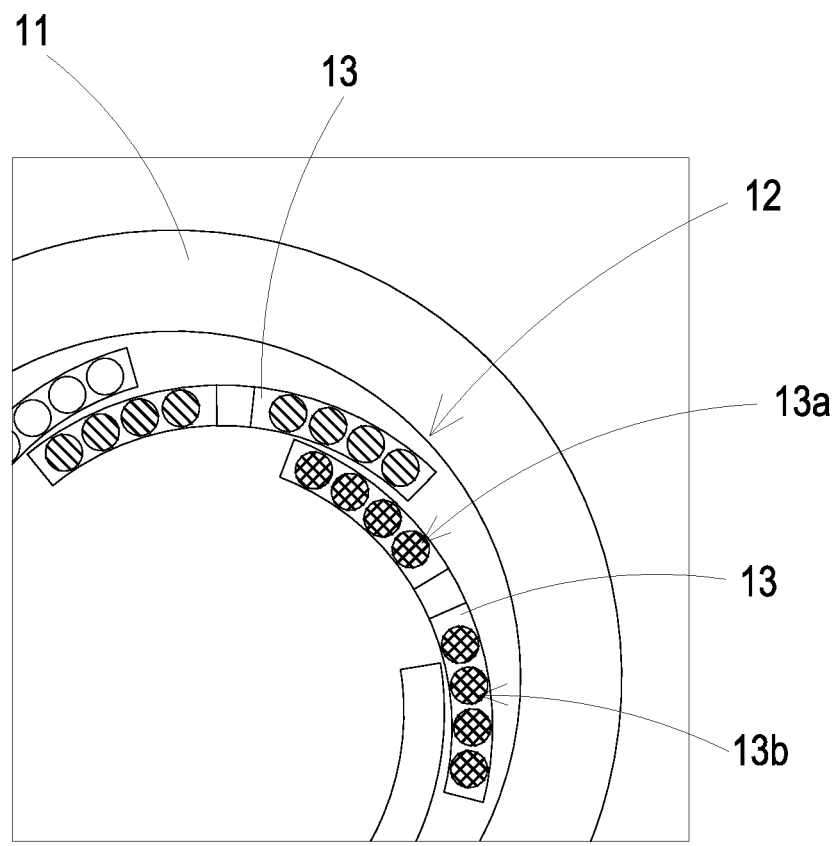
FIG. 1B is a cross-sectional view showing the winding assembly of FIG. 1A and a stator core.
Figure 2A:
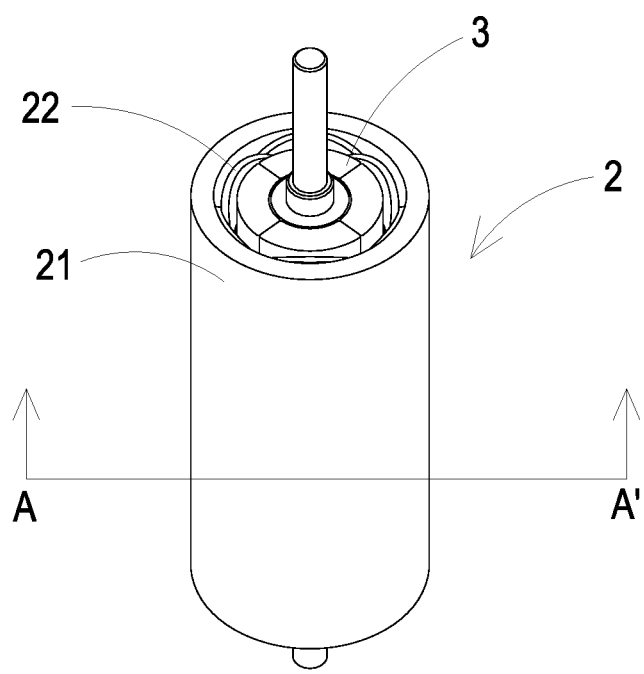
FIG. 2A is a schematic perspective view showing a rotary electric machine with a stator and a rotor according to an embodiment of the present disclosure.

Please refer to FIGS. 2A, 2B, 3A and 3B. The stator 2 of the present disclosure is applicable to a rotary electric machine 100 for example but not limited to an electric motor. Preferably, the rotary electric machine 100 is a three phases rotary electric machine, and more preferably, the rotary electric machine 100 is a slotless rotary electric machine, but not limited thereto. The rotary electric machine 100 further includes a rotor 3. As shown in FIG. 2A, the rotor 3 is disposed in the stator 2 and is rotatable relative to the stator 2.

In this embodiment, the stator 2 includes a stator core 21 and a winding assembly 22. The stator core 21 includes a tube wall 210 and a hollow portion 211, and the rotor 3 of the rotary electric machine 100 is disposed in the hollow portion 211. The winding assembly 22 is disposed in the hollow portion 211 and is located between the tube wall 210 and the rotor 3. The winding assembly 22 includes a first winding group 22a and a second winding group 22b. The first winding group 22a includes a plurality of winding units. The plurality of winding units of the first winding group 22a are disposed side by side on an inner side of the tube wall 210 and collaboratively define an outer layer. The second winding group 22b include includes a plurality of winding units. The plurality of winding units of the second winding group 22b are disposed side by side on an inner side of the outer layer and collaboratively define an inner layer. Each of the winding units at the inner layer is adjacent to two of the winding units at the outer layer. Any one of the shadows of the winding units at the inner layer projected on the tube wall 210 is partially overlapped with the shadows of the two adjacent winding units at the outer layer projected on the tube wall 210. A number of turns of the winding units of the first winding group 22a is equal to or greater than a number of turns of the winding units of the second winding group 22b.

In this embodiment, the first winding group 22a includes a first winding unit 221, a second winding unit 222 and a third winding unit 223. The second winding group 22b includes a fourth winding unit 224, a fifth winding unit 225 and a sixth winding unit 226. The first winding unit 221, the second winding unit 222 and the third winding unit 223 are disposed side by side on the inner side of the tube wall 210 in the hollow portion 211 of the stator core 21, thereby defining the outer layer. The fourth winding unit 224, the fifth winding unit 225 and the sixth winding unit 226 are disposed side by side on the inner side of the outer layer, thereby defining the inner layer. A radius of a circle defined by the outer layer is larger than a radius of a circle defined by the inner layer. That is, the first winding unit 221, the second winding unit 222, the third winding unit 223, the fourth winding unit 224, the fifth winding unit 225 and the sixth winding unit 226 are stacked along a radial direction of the stator core 21 and are interlocked with each other, so that the winding assembly 22 in a double-layer tubular structure is constructed inside the hollow portion 211.

In this embodiment, the first winding unit 221 and the fourth winding unit 224 are disposed on two opposite sides of the hollow portion 211 and collaboratively define a first combination. The second winding unit 222 and the fifth winding unit 225 are disposed on two opposite sides of the hollow portion 211 and collaboratively define a second combination. The third winding unit 223 and the sixth winding unit 226 are disposed on two opposite sides of the hollow portion 211 and collaboratively define a third combination. A voltage with a first phase is applied to the first combination defined by the first winding unit 221 and the fourth winding unit 224. A voltage with a second phase is applied to the second combination defined by the second winding unit 222 and the fifth winding unit 225. A voltage with a third phase is applied to the third combination defined by the third winding unit 223 and the sixth winding unit 226. In this embodiment, the phase difference between the first phase and the second phase is equal to 120 degrees. The phase difference between the second phase and the third phase is equal to 120 degrees. The phase difference between the third phase and the first phase is equal to 120 degrees. Thereby, the rotor 3 disposed in the hollow portion 211 of the stator core 21 of the stator 2 is rotated, and the control of the three phases rotary electric machine is achieved.

In this embodiment, the first winding unit 221 is at least partially overlapped with the fifth winding unit 225 and the sixth winding unit 226. The second winding unit 222 is at least partially overlapped with the fourth winding unit 224 and the sixth winding unit 226. The third winding unit 223 is at least partially overlapped with the fourth winding unit 224 and the fifth winding unit 225. In other words, the shadow of the first winding unit 221 projected on the tube wall 210 is at least partially overlapped with the shadows of the fifth winding unit 225 and the sixth winding unit 226 projected on the tube wall 210. The shadow of the second winding unit 222 projected on the tube wall 210 is at least partially overlapped with the shadows of the fourth winding unit 224 and the sixth winding unit 226 projected on the tube wall 210. The shadow of the third winding unit 223 projected on the tube wall 210 is at least partially overlapped with the shadows of the fourth winding unit 224 and the fifth winding unit 225 projected on the tube wall 210. In this embodiment, each of the winding units 221 to 226 includes a first lateral segment 221a to 226a, a second lateral segment 221b to 226b and an opening portion 221c to 226c. The first lateral segment 221a to 226a and the second lateral segment 221b to 226b are located on two opposite sides of the opening portion 221c to 226c, respectively. In this embodiment, a central line L of the winding unit 221 to 226 is parallel to an extending direction of the opening portion 221c to 226c. The first lateral segment 221a of the first winding unit 221 is completely overlapped with the second lateral segment 225b of the fifth winding unit 225. The second lateral segment 221b of the first winding unit 221 is completely overlapped with the first lateral segment 226a of the sixth winding unit 226. The first lateral segment 222a of the second winding unit 222 is completely overlapped with the second lateral segment 226b of the sixth winding unit 226. The second lateral segment 222b of the second winding unit 222 is completely overlapped with the first lateral segment 224a of the fourth winding unit 224. The first lateral segment 223a of the third winding unit 223 is completely overlapped with the second lateral segment 224b of the fourth winding unit 224. The second lateral segment 223b of the third winding unit 223 is completely overlapped with the first lateral segment 225a of the fifth winding unit 225. Thereby, the first winding units 221 to 226 are tightly arranged in the hollow portion 211.

Figure 3A:
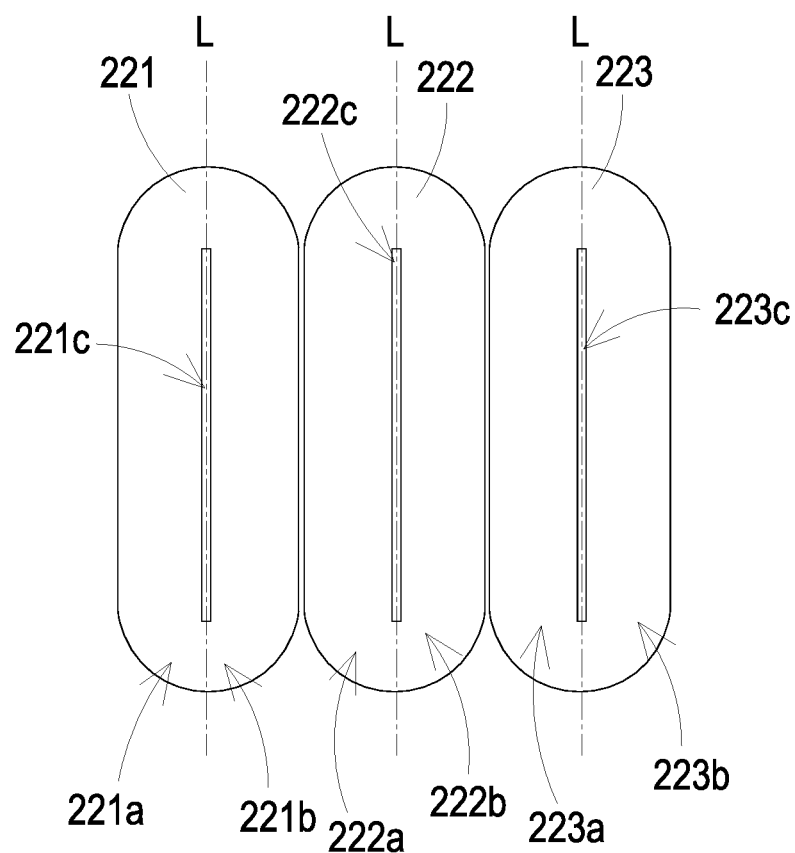
FIG. 3A is a schematic perspective view showing the arrangement of a plurality of winding units of a first winding group of FIG. 2B.
Figure 3B:
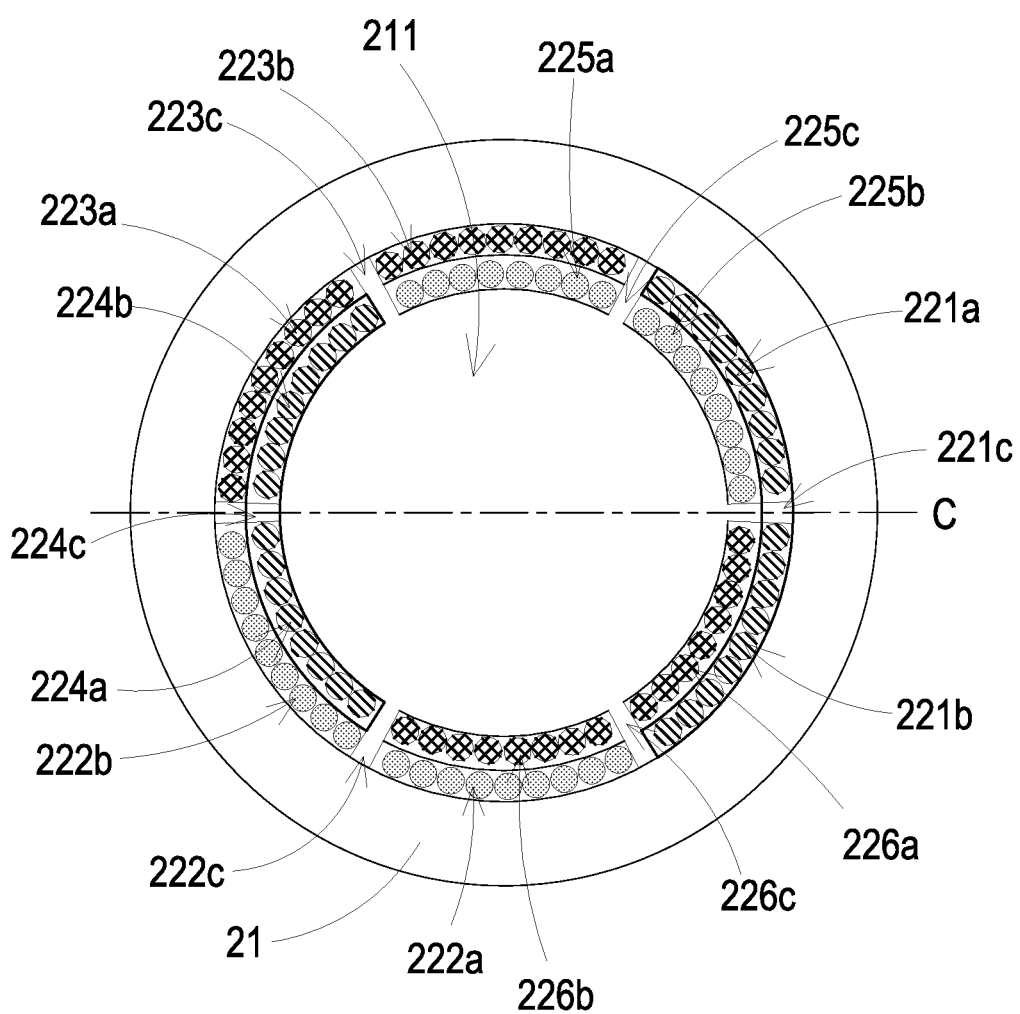
FIG. 3B is a cross-sectional view showing the stator and taken from the cross line A-A' in FIG. 2A.

In this embodiment, the winding units 221 to 226 are exemplarily but not exclusively spiral windings. The coils of the winding units 221 to 226 are arranged in a direction parallel to the circumference of the stator core 21. That is, the coils of the winding units 221 to 226 are arranged parallel to the periphery of the rotor 3 of the rotary electric machine 100. For example, as shown in FIG. 3B, the reference line C is a line connecting between the central line L of the first winding unit 221 and the central line L of the fourth winding unit 224. In this embodiment, both of the coils on the first lateral segment 221a and the second lateral segment 221b are arranged along a direction closing to the reference line C or along a direction leaving from the reference line C.

Figure 2B:
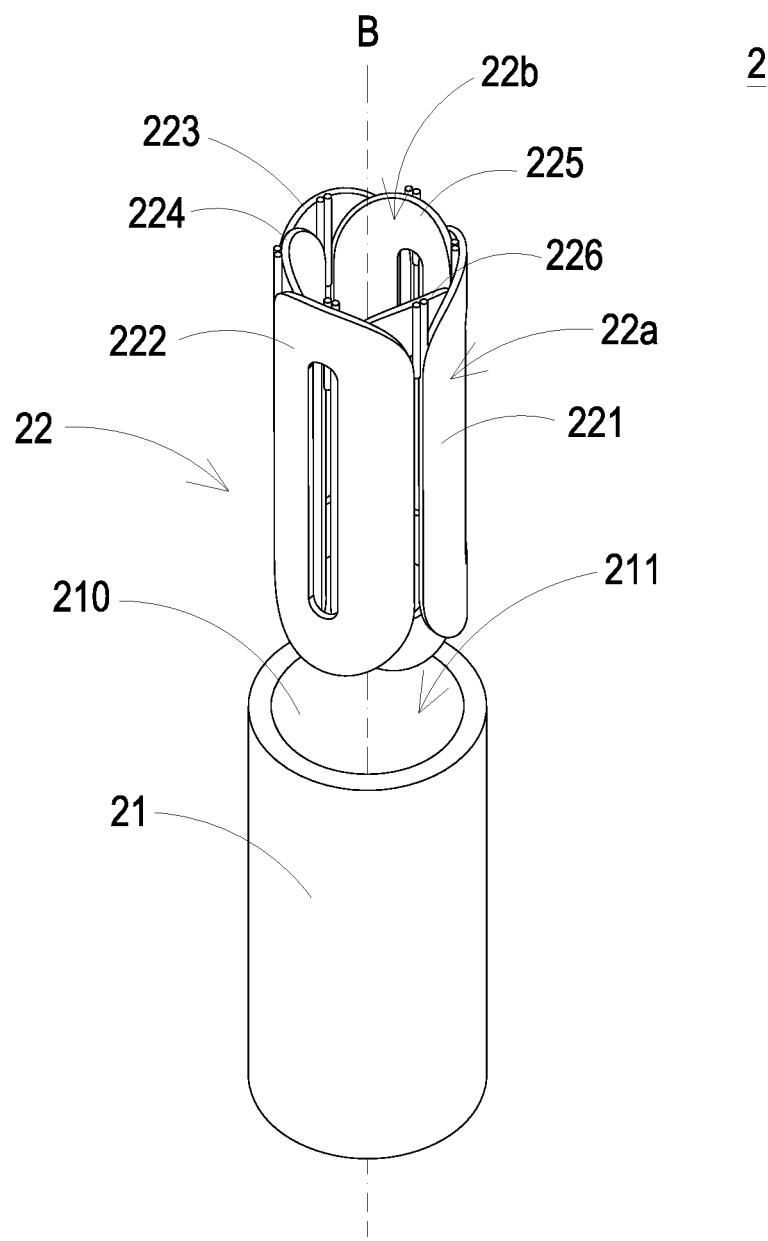
FIG. 2B is an exploded view showing the stator of FIG. 2A with a winding assembly and a stator core.

As shown in FIG. 2B, in this embodiment, the outer layer constructed by the first winding group 22a and the inner layer constructed by the second winding group 22b are concentric circles and collaboratively have an axis B. The radius of the outer layer is greater than the radius of the inner layer. The central lines L of all of the winding units 221 to 226 are parallel to the axis B, but not limited thereto. Each of the winding units 221 to 226 has an arc profile and has a radian on the short side. In this embodiment, each of the long side of the winding units 221, 222, 223 at the outer layer is adjacent to the long side of another winding unit 221, 222, 223. Each of the radians of the winding units 221, 222, 223 is substantially equal to $$\frac{2\pi}{3}.$$

Thereby, a continuous tubular structure is formed by the winding units 221, 222, 223, collaboratively. Each of the long side of the winding units 224, 225, 226 at the inner layer is adjacent to the long side of another winding unit 224, 225, 226. Each of the radians of the winding units 224, 225, 226 is substantially equal to $$\frac{2\pi}{3}.$$

Thereby, another continuous tubular structure is formed by the winding units 224, 225, 226, collaboratively. It should be noted that the arrangement of the winding units 221 to 226 is not limited thereto. In some embodiments, the winding units 221, 222, 223 at the outer layer and the winding units 224, 225, 226 at the inner layer are connected with each other through connecting components, but not limited thereto. Thereby, the winding units 221 to 226 can be simply and quickly assembled as the winding assembly 22. Consequently, the manufacturing process of the winding assembly 22 is simplified, and the accuracy or precision of the winding assembly 22 is improved.

In this embodiment, both of the first lateral segment 221a to 226a and the second lateral segment 221b to 226b of each of the winding units 221 to 226 are disposed at the same layer, i.e., disposed at the inner layer or the outer layer. Therefore, the number of turns of the winding units 221, 222, 223 disposed at the outer layer and the number of turns of the winding units 224, 225, 226 disposed at the inner layer can be individually designed. In the arrangement of the conventional winding assembly, the numbers of turns of the winding units are equal, and the first lateral segment of each of the winding unit is overlapped with the second lateral segment of another winding unit. In the structure of the winding assembly 22 with two layers, owing to the difference between the radiuses of the outer layer and the inner layer, the space capable of accommodating the coils of the outer layer is larger than that of the inner layer. In comparison with the prior art, the structure of the present disclosure is beneficial to improve the coil space factor of the winding assembly 22.

Figure 4:
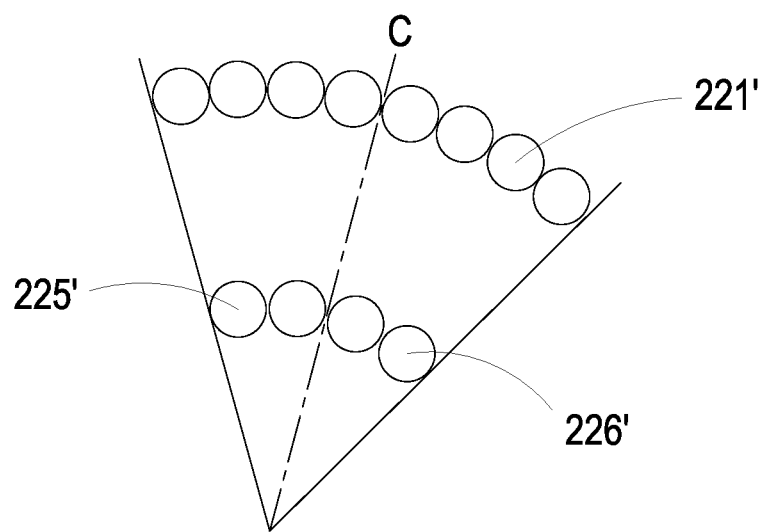
FIG. 4 is a cross-sectional view exemplarily showing the winding units at an outer layer and at an inner layer in the winding assembly according to another embodiment of the present disclosure.

FIG. 4 exemplarily shows the winding units at an outer layer and at an inner layer in the winding assembly according to another embodiment of the present disclosure. Taking the winding assembly shown in FIG. 4 as an example, in the areas of the inner layer and the outer layer enclosed with the same angle, the first winding unit 221' at the outer layer have four coils more than the numbers of coils of the fifth winding unit 225' and the sixth winding unit 226' at the inner layer. In the embodiment shown in FIG. 3B, owing to the radius difference between the outer layer and the inner layer, and the same radian of the winding units, the number of turns of the winding units disposed at the outer layer is more than that of the winding units disposed at the inner layer. For example, the number of turns of each of the winding units 221, 222, 223 at the outer layer is nine, and the number of turns of each of the winding units 224, 225, 226 at the inner layer is eight. That is, the winding units 221, 222, 223 at the outer layer may have at least one turn more than the number of turns of the winding units 224, 225, 226 at the inner layer. It should be noted that the number difference of turns between the winding units at the outer layer and the inner layer can be adjusted according to the size of the coil diameter. The number difference of turns can be increased in the case of the smaller coil diameter. As the result, the coil space factor of the outer layer in the two layers structure of the winding assembly 22 is increased, and the space of the hollow portion 211 of the stator core 21 can be utilized efficiently. Consequently, the torque of the rotary electric machine 100 is enhanced. In some embodiments, the number of turns of the winding units at the outer layer and at the inner layer in the winding assembly 22 may be equal.

From the above descriptions, the present disclosure provides a stator and a winding assembly thereof. By arranging the first lateral segment and the second lateral segment of every single winding unit at the same layer, the number of turns of the winding units disposed at the outer layer can be increased and be greater than the number of turns of the winding units disposed at the inner layer, thereby increasing the coil space factor of the outer layer in the two layers structure of the winding assembly. Furthermore, by the profile design of the winding units, the winding units are tightly arranged. As the result, the manufacturing process of the winding assembly is simplified, and the accuracy or precision of the winding assembly is improved. Consequently, the inner space of the stator core can be efficiently utilized, and the torque of the rotary electric machine is enhanced.

While the disclosure has been described in terms of what is presently considered to be the most practical and preferred embodiments, it is to be understood that the disclosure needs not be limited to the disclosed embodiment.

What is claimed is:

1. A stator for a rotary electric machine, the stator comprising:
   a stator core comprising a tube wall and a hollow portion; and
   a winding assembly disposed in the hollow portion and comprising:
   a first winding group comprising a plurality of winding units, wherein the plurality of winding units of the first winding group are disposed side by side on an inner side of the tube wall and collaboratively define an outer layer; and
   a second winding group comprising a plurality of winding units, wherein the plurality of winding units of the second winding group are disposed side by side on an inner side of the outer layer and collaboratively define an inner layer,
   wherein each of the winding units at the inner layer is adjacent to two of the winding units at the outer layer, wherein any one of shadows of the winding units at the inner layer projected on the tube wall is partially overlapped with shadows of the two adjacent winding units at the outer layer projected on the tube wall, and a number of turns of the winding units of the first winding group is greater than a number of turns of the winding units of the second winding group.

2. The stator according to claim 1, wherein the first winding group includes a first winding unit, a second winding unit and a third winding unit, and the second winding group includes a fourth winding unit, a fifth winding unit and a sixth winding unit.

3. The stator according to claim 2, wherein each of the first winding unit, the second winding unit, the third winding unit, the fourth winding unit, the fifth winding unit and the sixth winding unit includes a first lateral segment, a second lateral segment and an opening portion, wherein the first lateral segment and the second lateral segment are located on two opposite sides of the opening portion, respectively.

4. The stator according to claim 3, wherein the first lateral segment of the first winding unit is overlapped with the second lateral segment of the fifth winding unit, the second lateral segment of the first winding unit is overlapped with the first lateral segment of the sixth winding unit, the first lateral segment of the second winding unit is overlapped with the second lateral segment of the sixth winding unit, the second lateral segment of the second winding unit is overlapped with the first lateral segment of the fourth winding unit, the first lateral segment of the third winding unit is overlapped with the second lateral segment of the fourth winding unit, and the second lateral segment of the third winding unit is overlapped with the first lateral segment of the fifth winding unit.

5. The stator according to claim 2, wherein the first winding unit and the fourth winding unit are disposed on two opposite sides of the hollow portion and collaboratively define a first combination, the second winding unit and the fifth winding unit are disposed on two opposite sides of the hollow portion and collaboratively define a second combination, and the third winding unit and the sixth winding unit are disposed on two opposite sides of the hollow portion and collaboratively define a third combination.

6. The stator according to claim 5, wherein a voltage with a first phase is applied to the first combination, a voltage with a second phase is applied to the second combination, and a voltage with a third phase is applied to the third combination, wherein the phase difference between the first phase and the second phase is equal to 120 degrees, the phase difference between the second phase and the third phase is equal to 120 degrees, and the phase difference between the third phase and the first phase is equal to 120 degrees.

7. The stator according to claim 1, wherein each of the plurality of winding units of the first winding group and the plurality of winding units of the second winding group is a spiral winding and has a radian.

8. The stator according to claim 7, wherein the first winding group comprises three winding units, and the second winding group comprises three winding units, wherein each of the radians of the three winding units of the first winding group and the three winding units of the second winding group is equal to $$\frac{2\pi}{3}.$$

9. The stator according to claim 1, wherein the outer layer and the inner layer are concentric circles, and the radius of the outer layer is greater than the radius of the inner layer.

10. A winding assembly configured to be disposed in a stator, wherein the stator comprises a tube wall, and the winding assembly comprises:
    a first winding group comprising a plurality of winding units, wherein the plurality of winding units of the first winding group are disposed side by side on an inner side of the tube wall and collaboratively define an outer layer; and
    a second winding group comprising a plurality of winding units, wherein the plurality of winding units of the second winding group are disposed side by side on an inner side of the outer layer and collaboratively define an inner layer,
    wherein each of the winding units at the inner layer is adjacent to two of the winding units at the outer layer, wherein any one of shadows of the winding units at the inner layer projected on the tube wall is partially overlapped with shadows of the two adjacent winding units at the outer layer projected on the tube wall, and a number of turns of the winding units of the first winding group is than a number of turns of the winding units of the second winding group.

11. The winding assembly according to claim 10, wherein the first winding group includes a first winding unit, a second winding unit and a third winding unit, and the second winding group includes a fourth winding unit, a fifth winding unit and a sixth winding unit.

12. The winding assembly according to claim 11, wherein each of the first winding unit, the second winding unit, the third winding unit, the fourth winding unit, the fifth winding unit and the sixth winding unit includes a first lateral segment, a second lateral segment and an opening portion, wherein the first lateral segment and the second lateral segment are located on two opposite sides of the opening portion, respectively.

13. The winding assembly according to claim 12, wherein the first lateral segment of the first winding unit is overlapped with the second lateral segment of the fifth winding unit, the second lateral segment of the first winding unit is overlapped with the first lateral segment of the sixth winding unit, the first lateral segment of the second winding unit is overlapped with the second lateral segment of the sixth winding unit, the second lateral segment of the second winding unit is overlapped with the first lateral segment of the fourth winding unit, the first lateral segment of the third winding unit is overlapped with the second lateral segment of the fourth winding unit, and the second lateral segment of the third winding unit is overlapped with the first lateral segment of the fifth winding unit.

14. The winding assembly according to claim 10, wherein each of the plurality of winding units of the first winding group and the plurality of winding units of the second winding group is a spiral winding and has a radian.

15. The winding assembly according to claim 14, wherein the first winding group comprises three winding units, and the second winding group comprises three winding units, wherein each of the radians of the three winding units of the first winding group and the three winding units of the second winding group is equal to $$\frac{2\pi}{3}.$$

16. The winding assembly according to claim 10, wherein the outer layer and the inner layer are concentric circles, and the radius of the outer layer is greater than the radius of the inner layer.

* * * * *